United States Patent [19]
Alstad et al.

[11] Patent Number: 5,129,054
[45] Date of Patent: Jul. 7, 1992

[54] SPECIFYING 3D REFERENCE POINTS IN 2D GRAPHIC DISPLAYS

[75] Inventors: John K. Alstad; Jeffrey A. Hicke; Martin C. Lascelles; Stephen P. Sherman, all of Boulder; Michael Wong, Longmont, all of Colo.

[73] Assignee: International Business Machines Corporation, Armonk, N.Y.

[21] Appl. No.: 492,520

[22] Filed: Mar. 12, 1990

[51] Int. Cl.$^5$ .............................................. G06F 3/14
[52] U.S. Cl. ................................... 395/155; 395/119; 395/127; 364/146; 364/474.22
[58] Field of Search .............. 364/518, 521, 522, 146, 364/474.22; 340/706–710, 729; 395/119, 120, 122, 127, 155, 161

[56] References Cited

U.S. PATENT DOCUMENTS

| | | | |
|---|---|---|---|
| 4,516,266 | 5/1985 | Christopher et al. | 382/48 |
| 4,742,473 | 5/1988 | Shubar et al. | 364/518 |
| 4,827,413 | 5/1989 | Baldwin et al. | 364/413.19 |
| 4,855,939 | 8/1989 | Fitzgerald, Jr. et al. | 364/522 |
| 4,858,157 | 8/1989 | Murai et al. | 364/560 |

*Primary Examiner*—David L. Clark
*Attorney, Agent, or Firm*—Carl M. Wright

[57] ABSTRACT

Correlation of two-dimensional displayed points of an axonometric projection with corresponding three-dimensional points of the projected shapes. A point on a display screen surface is selected and the screen coordinates of the points of the three-dimensional shape are found by converting successive points of the shape to two-dimensional screen equivalents. Comparing the converted coordinates to those of the selected point identifies the shape point corresponding to the selected shape.

14 Claims, 3 Drawing Sheets

SPECIFYING 3D REFERENCE POINTS IN 2D GRAPHIC DISPLAYS

DOCUMENTS INCORPORATED BY REFERENCE

U.S. Pat. No. 4,731,609 FAST CORRELATION OF MARKERS WITH GRAPHIC ENTITIES and 4,754,267 FAST POINT/LINE CORRELATIONS IN GRAPHIC ENTITIES, assigned to a common assignee with this application, are hereby incorporated by reference. For the conversion to two-dimensional representations of three-dimensional objects, see Michael E. Mortenson, *Geometric Modelling* (New York: John Wiley & Sons, 1985) pp. 512-532.

BACKGROUND AND SUMMARY OF THE INVENTION

This invention relates to graphic display systems and particularly to identifying three-dimensional coordinates of objects corresponding to selected points of axonometric projections on the display screen.

CAD displays of three-dimensional objects are two-dimensional on the screen. Some CAD functions, e.g., 3-D ROTATE, require a user to enter the three-dimensional coordinates of points. The 3-D ROTATE example requires the user to enter the three-dimensional coordinates of a pair of points defining the axis of rotation.

Storage of the two-dimensional display (screen) coordinates corresponding to the three-dimensional (world) coordinates, as an attribute of the displayed points, is not always feasible. CAD programs are usually large and memory must be conserved as much as possible. Furthermore, when an entire screen is scaled, translated, or rotated, the time required for the calculation and display of the new two-dimensional points of the objects should be minimized.

The stored three-dimensional points defining objects in a world coordinate system can undergo several manipulations before being displayed because of selective changes in the viewpoint, orientation of the objects by the user, or changes in the eye point. The world coordinate points are stored but not the corresponding two-dimensional display coordinates in order to conserve memory space and to reduce the number of operations required to store the latter in a data base.

The present graphic and CAD systems require the user to keep notes or memorize the three-dimensional coordinates of the desired points or to find them by trial-and-error methods.

U.S. Pat. No. 4,516,266 identifies points on a display according to pels selected on the face of the display using a light pen. The feature, e.g., box, circle, line, or arc, to which the pel (one of the picture elements or dots making up the display) belongs is highlighted when the pel position is identified.

U.S. Pat. No. 4,858,157 shows a coordinate measuring system having a detecting unit with an optical system for obtaining an image of an object. The control unit for taking out data from each array element in the detecting unit does not operate in a manner that requires identification of the three-dimensional coordinates.

U.S. Pat. No. 4,855,939 models a three-dimensional object from dimension and tolerance information supplied by the operator which is displayed on a plan or elevation view. This information is automatically converted to a displayed axonometric drawing.

U.S. Pat. No. 4,827,413 discloses a method for displaying three-dimensional images using a back-to-front algorithm that converts vectors.

The invention is invoked when a graphics or CAD function requiring the three-dimensional coordinates of a point prompts the user to enter the coordinates. The user can move a cursor to or near the desired point which is high-lighted on the display for verification as the selected point and the u,v (screen) display coordinates of the selected point are determined. The program then enters a loop in which the u',v' (world) display coordinates corresponding to successive three-dimensional points are calculated and compared to the u,v coordinates of the selected point.

If the u,v and u',v' points are the same, the corresponding three-dimensional coordinates are returned to the user via the display or, alternatively, entered automatically in the calling function.

If all points are converted and compared with none the same as the u,v point, then an error routine is called and the subroutine exited.

In accordance with the invention, a selected point on a two-dimensional display representing a three-dimensional object is related to its corresponding three-dimensional coordinates by determining the display coordinates of the selected point and converting stored three-dimensional points to their corresponding two-dimensional display coordinates until the latter coordinates are the same as the display coordinates of the selected point.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

Figure 1:
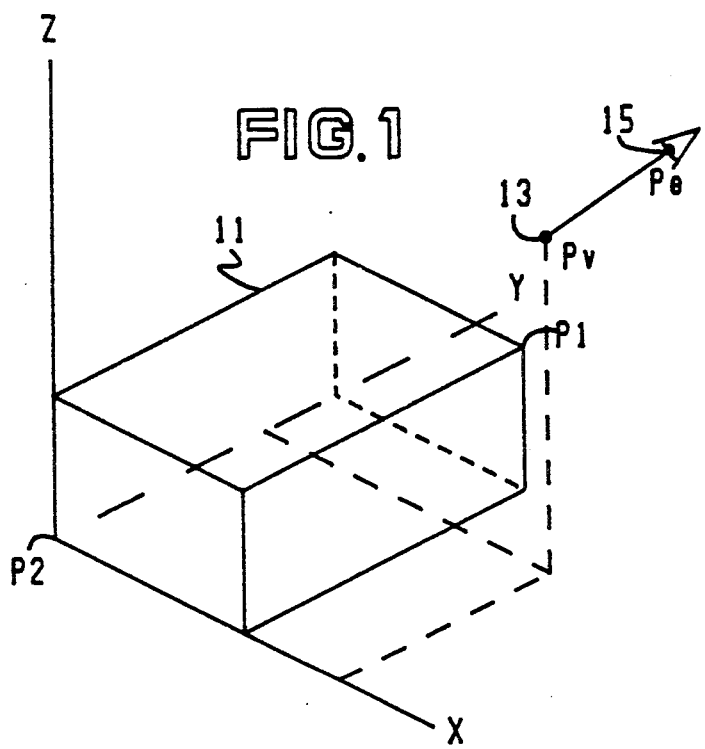
FIG. 1 is a projective geometric representation of a three-dimensional world coordinate system that contains the solids and shapes to be displayed.

In the following description, references are made to the flowcharts depicting the sequence of operations performed by the program. The symbols used therein are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions depend on the particular hardware used to implement the invention. Different processors have different instruction sets but the person of ordinary skill in the art is familiar with the instruction set with which he works and can implement the operations set forth in the blocks of the flowchart.

To preclude confusion caused by details of the implementing program that are not relevant to an understanding of the invention, the invention is described as a subroutine.

Subroutines are computer program modules that are not placed directly in the stream of instructions in which they are used. Subroutines are invoked by call and link procedures which cause the program execution to transfer to the list of computer instructions comprising the subroutine program and to link or to supply the operands used by the subroutine. When a subroutine has completed execution, the program control returns to the instruction in the calling program following that which called the subroutine.

Standard symbols are used with x representing matrix multiplication. The three-dimensional system or space containing the objects being displayed is referred to as the world system and the two-dimensional system, i.e., the display itself, is referred to as the display system.

The invention provides a user of a graphics system the capability of identifying the coordinates of an object in the three-dimensional space which exists in that space but is displayed in two dimensions, e.g., on a display screen. In the simplest case, the user can select a point on the two-dimensional display and have the three-dimensional world coordinates of the corresponding point depicted.

The objects are commonly stored in a data base according to the coordinates of the world coordinate system. The two-dimensional display presentation depends, inter alia, on the location of the eye point, i.e., the point in space of an eye which would see the world system as it is displayed on a flat surface or display screen. Another factor is the view point, the location of the point to which the eye is directed.

The user can select functions that rotate or scroll the viewed display up or down, right or left, or any combination of movements. The user can also change the scale of the display. Such manipulations, like the movements of a conjurer, make it difficult for the user of a graphic system to keep track of the points corresponding to the points in the world coordinate system. Therefore, when a function requires the selection or designation of a three-dimensional point, the user has the problem of determining which point or designation to specify.

FIG. 1 represents a three-dimensional, right-hand coordinate system, i.e., a world coordinate system, containing a rectangular solid 11.

Objects in the world system can be identified by specifying their vertices, e.g., P1 and P2 of the rectangular solid 11. The rectangular solid 11 is stored in a database in terms of the three-dimensional world coordinates, denoted by Xi, Yi, and Zi for i through n. That is, there are n vertices or points specifying the object and stored in the data base.

A viewpoint, Pv 13, is located at coordinates Xv, Yv, and Zv and an eye point, Pe 15, is located at coordinates Xe, Ye, and Ze. Changing the locations of Pv 13 and Pe 15 alters the aspect of the world system.

Figure 2:
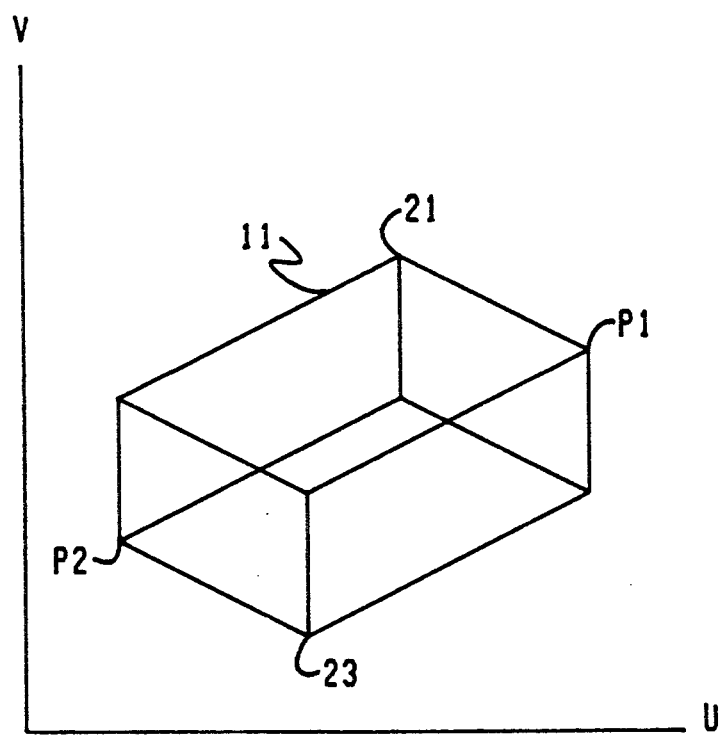
FIG. 2 is an illustration of an axonometric projection of a rectangular solid as viewed in the world coordinate system.

FIG. 2 is an axonometric projection of the rectangular solid 11 of FIG. 1 onto a two-dimensional surface or display screen having coordinates U and V. Techniques for converting from a three-dimensional system having the specified eye point and viewpoint to an axonometric projections are well known and two such techniques will be described below in detail.

In a graphics system displaying the rectangular solid 11 as shown in FIG. 2, it may be desirable to rotate the solid about a specified axis of rotation. For example, in FIG. 2, a pair of points P1 and P2 corresponding the same points P1 and P2 in FIG. 2 can specify an axis about which the solid 11 is to be rotated. Because of the optical illusion created by projecting all vertices and edges from the world system of FIG. 1 onto the flat surface in FIG. 2, the user may not be able to determine whether the points P1 and P2 may be vertices 21 and 23. If the user were to assume that the vertices 21 and 23 were the desired points defining the axis of rotation and selected them in response to prompts from the rotation function, the error would become apparent when the solid 11 was rotated incorrectly. This would require the user to rotate the solid 11 in the opposite direction over the same axis defined by the vertices 21 and 23 and then to attempt to select the correct vertices to define the desired axis of rotation.

In addition to selecting points with a cursor, as shown in the patents incorporated herein by reference, the user usually has the option of inputting the coordinates of the points desired, e.g., by keying in the coordinate values. This requires the user to keep a list of coordinates or to remember the coordinates of the points in the three-dimensional world system. The invention, however, permits the user to select a point using a movable cursor or the like, and to have the three-dimensional world coordinates displayed for verification by the user.

Figure 3:
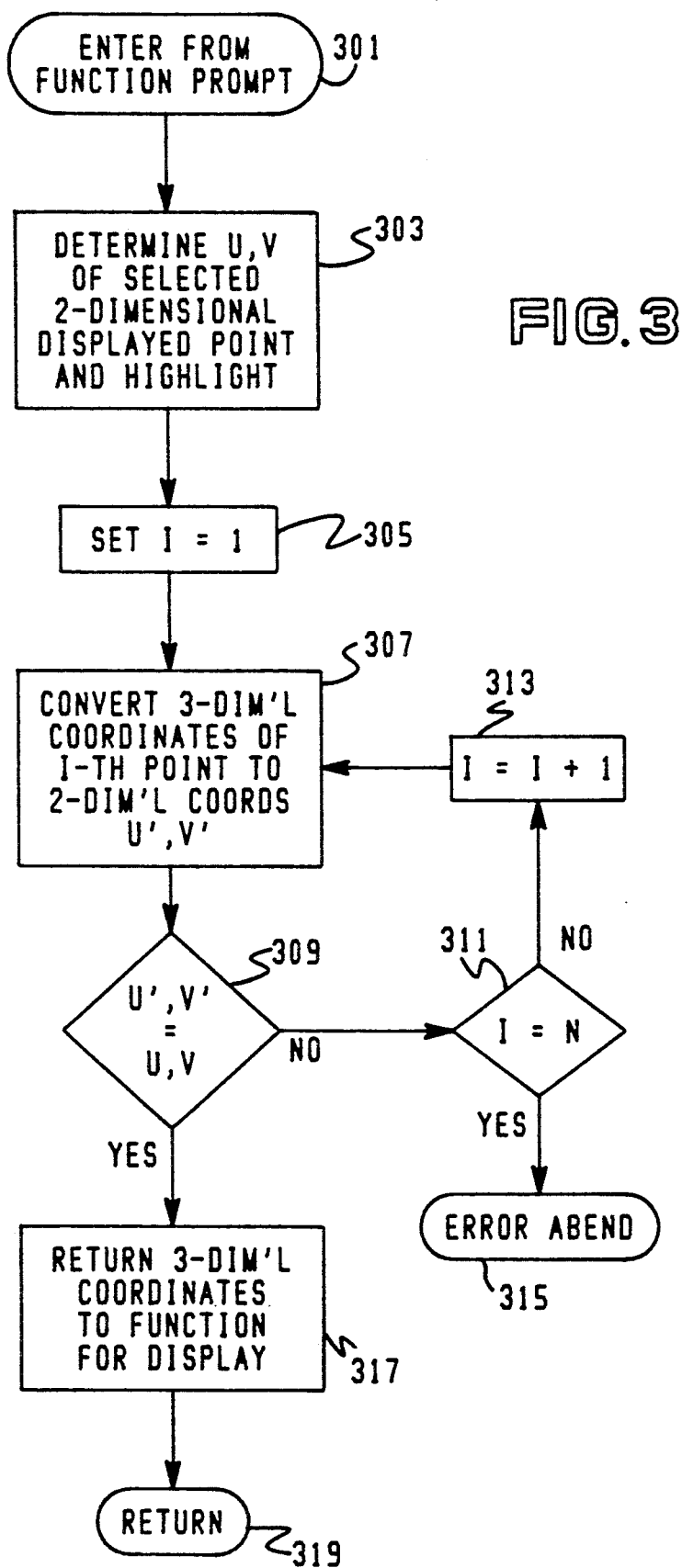
FIG. 3 is a flowchart that illustrates the invention.

The flowchart of FIG. 3 describes an implementation of the invention in the form of a program subroutine which avoids the problems encountered in the prior art approaches discussed above.

The subroutine is entered, at a terminal block 301 from a function prompt requiring the designation of a three-dimensional coordinate. In a process block 303, a selected two-dimensional point is highlighted for verification and selected by the user. The two-dimensional screen coordinates of the selected point, U and V, are determined. Next, as shown in a process block 305, an index value I is set to one. The world points corresponding to the displayed points on the screen are stored in a database and the I-th point is accessed and converted to two-dimensional coordinates U' and V' as shown in a process block 307.

As shown in a decision block 309, the converted world coordinates, U',V', are compared to the coordinates of the selected point, U,V. If equal, then the world coordinates of the I-th point are returned for display and verification by the user as shown by a process block 317 and the subroutine exited by a terminal block 319. If the compared coordinates are not the same in the decision block 309, then the value of I is compared to the value of N, representing the total number of points to be examined, in a decision block 311.

If all points have been examined, indicated by an equality between I and N, then there has been an error since no point has been found corresponding to the selected screen point. This causes an abnormal termination, ABEND, as shown by a terminal block 315. This exit from the subroutine can cause an error routine to be executed to correct the cause of the error or simply supply a message to the user that there has been an error.

If all the points have not been examined, then the value of I is incremented by a value of one as shown in a process block 313 and the next point converted, as explained above, by the process block 307. The process then repeats as explained above.

It is possible for a selected screen point to correspond to more than one world point. That is, several world points may be overlaid and seen by the user as a single point on the display screen.

Figure 4:
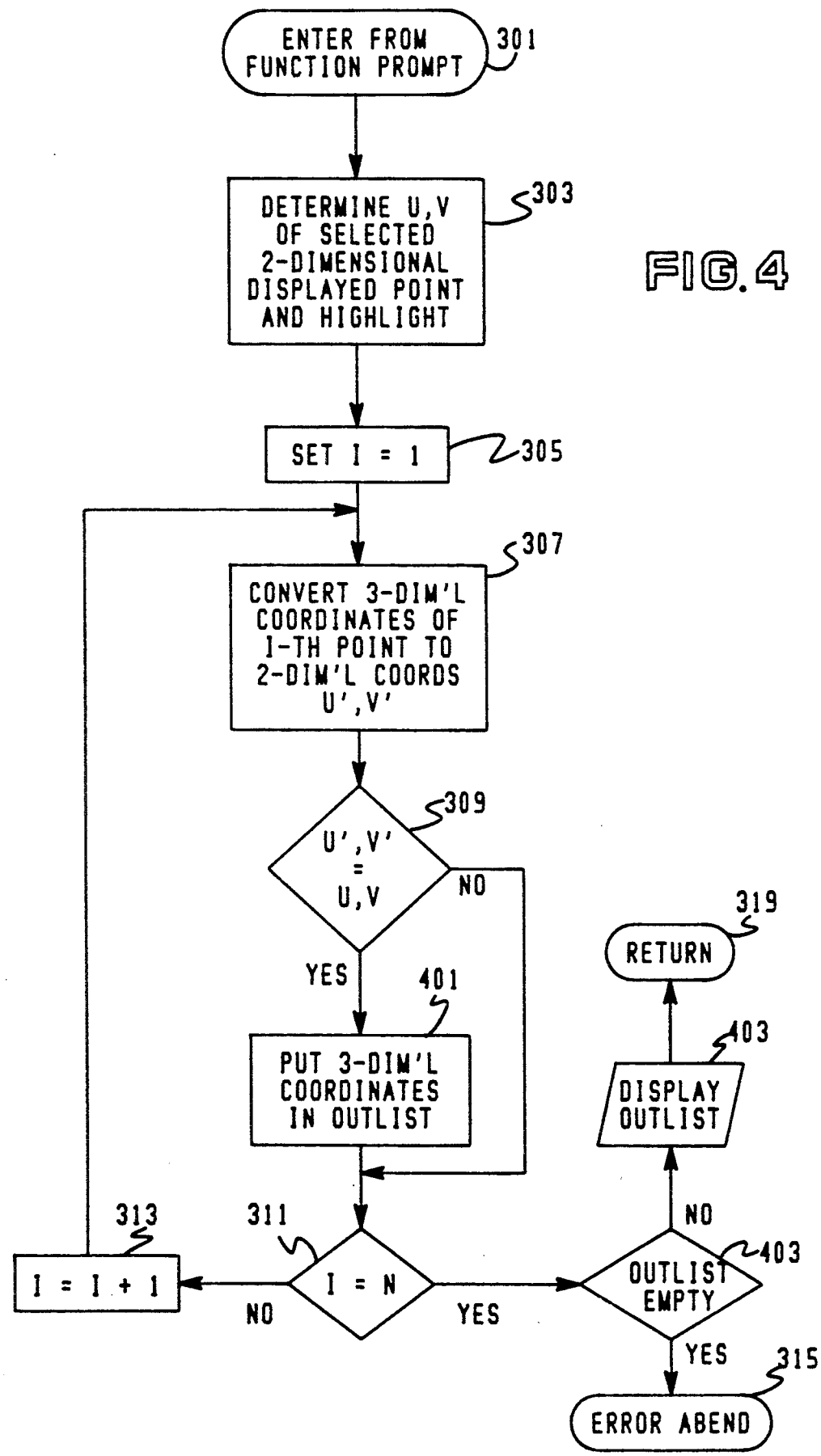
FIG. 4 is a flowchart of an alternative version of the invention.

The invention can be modified as shown in the flowchart of FIG. 4 to accommodate a plurality of overlaid points. The subroutine of FIG. 4 operates through blocks 301–309 in the same manner as described for the same blocks in the flowchart of FIG. 3. Instead of returning the world coordinates of the selected screen points as shown in the process block 317 of FIG. 3, the modified flowchart of FIG. 4 places the world coordinates in an output list, OUTLIST.

When all the stored world coordinate points have been processed as indicated by an equality between I and N in the decision block 311 as previously described, the subroutine checks to determine whether the output list, OUTLIST, is empty in a decision block 403.

If OUTLIST is empty, then the abnormal termination of terminal block 315 is made as previously described. If OUTLIST is not empty, then the world coordinates of OUTLIST are displayed in the output block 405.

The user can then select, using a cursor or lightpen or some similar device, the desired set of world coordinates.

The output block 405 can include a step of sorting the world coordinate points by descending values of the Z coordinate so as to list them in order from the top down or by ascending values to list them in order from the bottom up to assist the user in determining which of the sets of world coordinates to select. The points can be sorted by the transformed Zt coordinates, q.v., so as to select automatically the point closest to the observer.

The selection of points by a cursor are described in the patents incorporated herein by reference.

This correlation technique is also applicable to selection of edges or faces of three-dimensional shapes. The two-dimensional line segment nearest the cursor or selection device is determined and the pairs (or sets) of three-dimensional points defining the corresponding three-dimensional edge (or face) are determined.

The conversion of the world coordinates to screen coordinates by the process block 307 can be performed in several ways well known in the art. Two ways are next discussed in detail.

Well known formulae for converting the points of threedimensional objects to two-dimensional display coordinates are $$Ui = \frac{K(Xe^2 + Ye^2 + Ze^2)(XeYi - YeXi)}{\sqrt{(Xe^2 + Ye^2)[(Xe^2 + Ye^2 + Ze^2) - (XeXi + YeYi + ZeZi)]}}$$

$$Vi = \frac{K\sqrt{(Xe^2 + Ye^2 + Ze^2)[Zi(Xe^2 + Ye^2) - Ze(XeXi + YeYi)]}}{\sqrt{(Xe^2 + Ye^2)[(Xe^2 + Ye^2 + Ze^2) - (XeXi + YeYi + ZeZi)]}}$$

where
Xe, Ye, Ze are coordinates of the viewing eye (Pe),
Xi, Yi, Zi are coordinates of the i-th point of the object to be displayed,
Ui, Vi are coordinates of the i-th point in the two-dimensional display, and K is a convenient scaling factor.

An improved and more preferred way of converting the world system objects to screen system displays is more flexible and provides several advantages. It is described next.

The three-dimensional points Xi, Yi, and Zi, defining an object in the world coordinates shown in FIG. 1, are translated to the viewpoint, Xv, Yv, and Zv, by a translation matrix, Tv, given by $$Tv = \begin{vmatrix} 1 & 0 & 0 & 0 \\ 0 & 1 & 0 & 0 \\ 0 & 0 & 1 & 0 \\ -Xv & -Yv & -Zv & 1 \end{vmatrix}$$

The world coordinates of the eye point Xe, Ye, and Ze are transformed by $$X' = Xe - Xv,$$

$$Y' = Ye - Yv, \text{ and}$$

$$Z' = Ze - Zv.$$

Setting $\alpha = \arctan(-X'/Y')$, the transformed eye point is rotated into the X-Z plane by a transformation matrix, Tz, given by $$Tz = \begin{vmatrix} \cos\alpha & \sin\alpha & 0 & 0 \\ -\sin\alpha & \cos\alpha & 0 & 0 \\ 0 & 0 & 1 & 0 \\ 0 & 0 & 0 & 1 \end{vmatrix}$$

Using $\beta = \arctan(\sqrt{(X'^2+Y'^2)}(-Z'))$, the transformed eye point is rotated into the Z-axis by multiplying by a matrix, Ty, given by $$Ty = \begin{vmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{vmatrix}$$

Multiplying the Xi, Yi, and (Zi+1) values, the latter representing a vector along the world Z-axis, by the matrices Tv, Tz, and Ty generates X'', Y'', and Z''. This makes the up direction in the display correspond to the up direction in the world system.

|Xi Yi Zi+1 1 | ×Tv×Tz×Ty= |X'' Y'' Z''1|

Taking $\gamma = \arctan(X''/Y'')$, a matrix, Tr, to rotate the transformed Z-axis into the screen vertical, is given by $$Tr = \begin{vmatrix} \cos\gamma & \sin\gamma & 0 & 0 \\ -\sin\gamma & \cos\gamma & 0 & 0 \\ 0 & 0 & 1 & 0 \\ 0 & 0 & 0 & 1 \end{vmatrix}$$

A right-hand to left-hand coordinate system conversion is effected—to display the three-dimensional object correctly with respect to the Z-axis—by a matrix, Tc, given by $$Tc = \begin{vmatrix} 1 & 0 & 0 & 0 \\ 0 & 1 & 0 & 0 \\ 0 & 0 & -1 & 0 \\ 0 & 0 & 0 & 1 \end{vmatrix}$$

By multiplying the X″, Y″, and Z″ coordinates by two matrices, another set of coordinates, Xt, Yt, and Zt is obtained, i.e., $$|X|Y|Z|1| \times Tr \times Tc = |Xt\ Yt\ Zt\ 1|$$

Using the values thus obtained, the screen coordinates are found by a perspective projection $$U = Xt/[1+(Zt/d)], \text{ and}$$

$$V = Yt/[1+(Zt/d)]$$

where d is the distance from the eye point to the view point in the world system, i.e., from Pe to Pv in FIG. 1, given by
$$d = \sqrt{(X'^2 + Y'^2 + Z'^2)}.$$

This technique is described in Mortenson's book, supra, in more detail using a different notation.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a graphics display system representing three-dimensional objects on a two-dimensional display screen, a method of selecting three-dimensional coordinates of a point of a three-dimensional object as a reference point for the execution of an operation relative to said three-dimensional object comprising the steps of:
    selecting a reference point on the two-dimensional display screen corresponding to the reference point on a three-dimensional object on which said operation is to be performed;
    determined the two-dimensional coordinates of the selected point relative to the display screen;
    converting stored three-dimensional coordinates representing displayed points to two-dimensional coordinates relative to the display screen;
    comparing the determined two-dimensional coordinates to the converted two-dimensional coordinates until an equality results; and
    executing the operation on the three-dimensional object with respect to the reference point determined as the three-dimensional point having converted two-dimensional coordinates equal to the selected two-dimensional point.

2. The method claimed in claim 1 wherein the operation to be executed is a translation operation for moving the location of said three-dimensional object to another location in three-dimensional space including the additional step of:
    specifying the location in three-dimensional space of the location of said three-dimensional reference point to which said object is to be moved relative to said reference point.

3. The method claimed in claim 1 wherein the operation to be executed is a rotation operation for rotating the three-dimensional object relative to said selected three-dimensional reference point including the additional step of:
    specifying the angles in three-dimensional space through which said object is to be rotated relative to said reference point.

4. The method claimed in claim 1 wherein the operation to be executed is a copy operation for reproducing the three-dimensional object at another location in three-dimensional space including the additional step of:
    specifying the location in three-dimensional space at which said object is to be reproduced relative to said reference point.

5. The method claimed in claim 1 wherein the operation to be executed is an attach operation for attaching at the reference point of said three-dimensional object another graphic entity including the additional step of:
    specifying a graphic entity to be attached to said three-dimensional reference point.

6. The method claimed in claim 1 wherein the operation to be executed is a scaling operation for changing dimensions of said three-dimensional object relative to said three-dimensional reference point including the additional step of:
    specifying the scaling factors in three-dimensional space of the three-dimensional object relative to said reference point.

7. The method claimed in claim 1 wherein the operation to be executed is an operation for shifting the location and direction of the viewing point of said three-dimensional object in three-dimensional space including the additional step of:
    specifying the location in three-dimensional space relative to said three-dimensional reference point to which to move said viewing point.

8. In a graphics display system representing three-dimensional objects on a two-dimensional display screen, means for selecting three-dimensional coordinates of a point on a three-dimensional object as a reference point for the execution of an operation relative to said three-dimensional objects, the combination comprising:
    first means for controlling selection of a displayed point corresponding to a three-dimensional reference point;
    second means for controlling determination of the two-dimensional coordinates of the displayed point relative to a display surface;
    third means for controlling conversion of stored three-dimensional coordinates corresponding to displayed points into two-dimensional coordinates relative to the display surface;
    fourth means for controlling comparison of the coordinates converted by said third means to the coordinates determined by the second means; and
    fifth means for controlling the execution of said operation relative to said three-dimensional reference point having two-dimensional coordinates corresponding to the displayed point selected by the first means as determined by an equality in the fourth means.

9. The combination claimed in claim 8 wherein the operation to be executed is a translation operation for moving the location of said three-dimensional object to another location in three-dimensional space including the additional means:
    sixth means for controlling specifying the location in three-dimensional space of the location of said three-dimensional reference point to which said object is to be moved relative to said reference point.

10. The combination claimed in claim 8 wherein the operation to be executed is a rotation operation for rotating the three-dimensional object relative to said selected three-dimensional reference point including the additional means:
   sixth means for controlling specifying the angles in three-dimensional space through which said object is to be rotated relative to said reference point.

11. The combination claimed in claim 8 wherein the operation to be executed is a copy operation for reproducing the three-dimensional object at another location in three-dimensional space including the additional step of:
   sixth means for controlling specifying the location in three-dimensional space at which said object is to be reproduced relative to said reference point.

12. The combination claimed in claim 8 wherein the operation to be executed is an attach operation for attaching at the reference point of said three-dimensional object another graphic entity including the additional means:
   sixth means for controlling specifying a graphic entity to be attached to said three-dimensional reference point.

13. The combination claim in claim 8 wherein the operation to be executed is a scaling operation for changing dimensions of said three-dimensional object relative to said three-dimensional reference point including the additional means:
   sixth means for controlling specifying the scaling factors in three-dimensional space of the three-dimensional object relative to said reference point.

14. The combination claimed in claim 8 wherein the operation to be executed is an operation for shifting the location and direction of the viewing point of said three-dimensional object in three-dimensional space including the additional step of:
   sixth means for controlling specifying the location in three-dimensional space relative to said threedimensional reference point to which to move said viewing point.

* * * * *